United States Patent [19]

Ohara

[11] Patent Number: 5,144,297
[45] Date of Patent: Sep. 1, 1992

[54] DIGITAL CROSS CONNECTION APPARATUS

[75] Inventor: Katsuichi Ohara, Kunitachi, Japan

[73] Assignee: Fujitsu Limited, Kawasaki, Japan

[21] Appl. No.: 637,227

[22] Filed: Jan. 3, 1991

[30] Foreign Application Priority Data

Jan. 9, 1990 [JP] Japan ................................. 2-1745

[51] Int. Cl.⁵ .......................................... H04Q 11/04
[52] U.S. Cl. ......................... 340/825.79; 340/825.85; 340/825.89; 370/60; 370/84; 364/240.8
[58] Field of Search ........... 340/825.03, 825.5, 825.34, 340/825.79, 825.85, 825.89; 370/57, 58.1, 58.2, 60, 60.1, 61, 84, 99, 99.1, 110.1, 112; 379/165; 364/200 MS; 395/575 MS, 141 MS, 425 MS; 359/135 MS

[56] References Cited

U.S. PATENT DOCUMENTS 4,670,627  6/1987  Fisher et al. ........................ 370/58.2
4,967,405 10/1990  Upp et al. .......................... 370/58.1
4,998,242  3/1991  Upp ....................................... 370/60
5,040,170  8/1991  Upp et al. .......................... 370/94.1

FOREIGN PATENT DOCUMENTS 64-4131   1/1989  Japan .
1-101747  4/1989  Japan .

Primary Examiner—Donald J. Yusko
Assistant Examiner—John Giust
Attorney, Agent, or Firm—Helfgott & Karas

[57] ABSTRACT

A cross connection apparatus which performs cross connection using divided VT signals, as cross connection units, obtained by division of the VT sizes foming virtual tributary (VT) signals of input side transmission line signals into whole integers by a predetermined common size unit, wherein it is possible to perform cross connection by common hardware even if a plurality of types of VT signals having different VT sizes are input.

11 Claims, 13 Drawing Sheets

ADDITIONAL SIGNAL

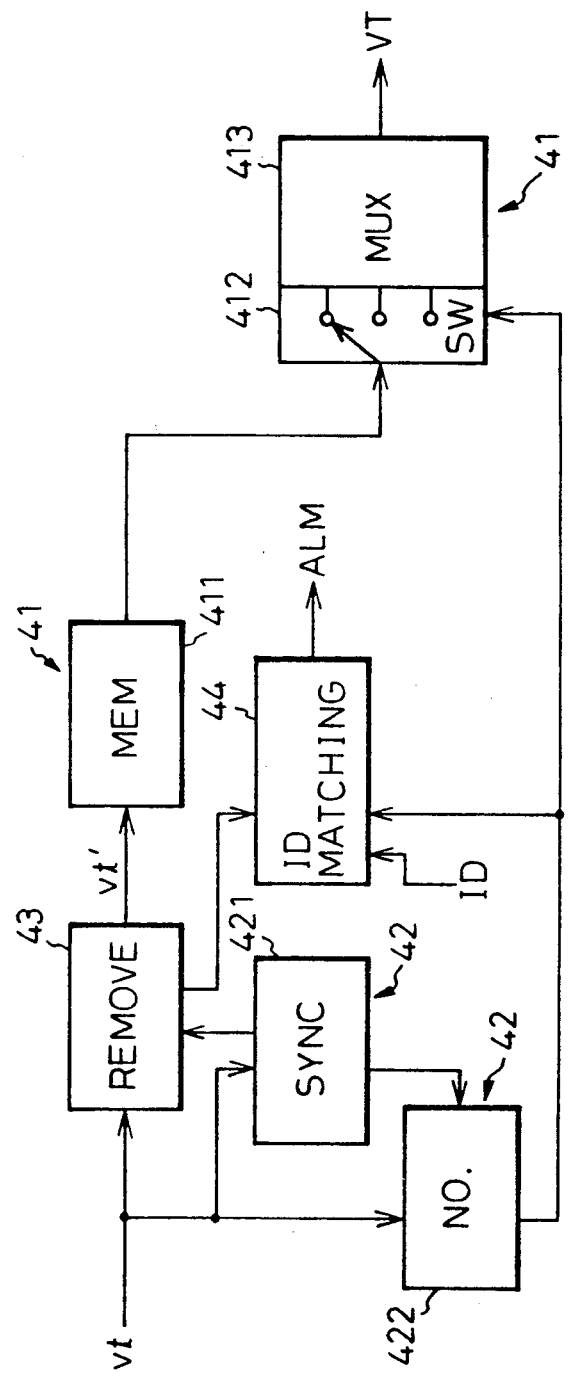

DIGITAL CROSS CONNECTION APPARATUS

BACKGROUND OF THE INVENTION

1. Field of the Invention

The present invention relates to a digital cross connection apparatus which can be applied to the cross connection of virtual tributary (VT) signals of synchronous optical network (SONET) specifications.

In digital cross connection apparatuses, in particular broad band digital connection apparatuses, it is necessary to be able to cross connect VT signals of various VT sizes corresponding to, for example, the North American 1.5M (Mega bit/second, same below), 3M, and 6M and CEPT (Conference of European Postal and Telecommunications Administration) 2M signals using a common hardware construction. Here, the invention will be explained with reference to primarily VT signals of the SONET specifications.

2. Description of the Related Art

In a digital cross connection apparatus handling SONET signals, use is made of VT signals of a VT format for the frame structure in signal processing in the apparatus. For example, in the case of cross connection of North American 1.5M, 3M, and 6M signals, use is made, for example, of the VT1.5 size as the cross connection unit and it is possible to simultaneously cross connect signals of VT3 and VT6 sizes, as these are whole multiples of the VT1.5 size.

CEPT signals, however, have a VT size of VT2. VT2 is not a whole multiple of VT1.5, so if it is attempted to cross connect VT2 size signals by an apparatus using VT1.5 as the cross connection unit, the efficiency becomes extremely poor. Therefore, cross connection of VT2 had required changing of the switch units and other hardware so as to handle VT2 size cross connection units.

Therefore, in digital cross connection apparatuses handling SONET signals, despite it being considered necessary to cross connect any signal input, whether of the CEPT specification or North American specification, it has not been possible to make common use of the switch units and other hardware for these signals, so these signals have not been handled by the same apparatuses in the past, i.e., separate apparatuses have been necessary.

SUMMARY OF THE INVENTION

Therefore, the object of the present invention is to enable cross connection of any SONET signals, for example, North American and CEPT SONET signals by using the same hardware construction.

To achieve the above object, the present invention provides a digital cross connection apparatus in which the two or more types of VT signals are handled in the apparatus after division by common size units and the thus divided units are used as cross connection units.

BRIEF DESCRIPTION OF THE DRAWINGS

The above object and features of the present invention will be more apparent from the following description of the preferred embodiments with reference to the accompanying drawings, wherein:

FIG. 13 is a view showing a processing means according to the present invention which is provided in an output side interface unit.

DESCRIPTION OF THE PREFERRED EMBODIMENTS

Embodiments of the present invention will be described with reference to the drawings.

Figure 1:
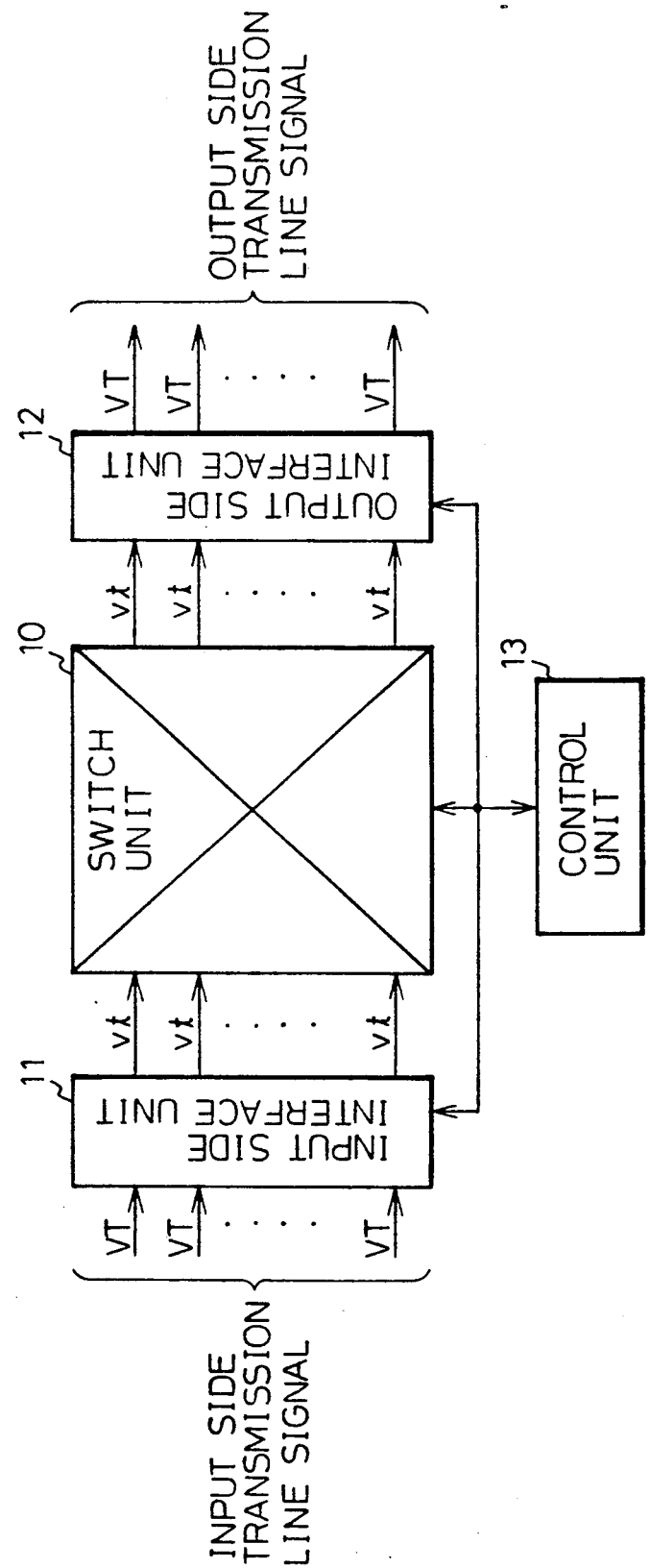
FIG. 1 is a block diagram showing the key portions of a digital cross connection apparatus to which the present invention is applied.

FIG. 1 is a block diagram showing the key portions of a digital cross connection apparatus to which the present invention is applied. In the figure, the digital cross connection apparatus includes a switch unit 10 which performs the cross connection, an input side interface unit 11 which is provided at the input side of the switch unit 10 and receives a plurality of input side transmission line signals composed of two or more types of virtual tributary VT signals; and an output side interface unit 12 which is provided at the output side of the switch unit 10 and transmits signals which have been cross connected by the switch signal as a plurality of output side transmission line signals. Note that a digital cross connection apparatus includes a cross connection control unit 13 comprised of a processor.

The point in the present invention is that the switch unit 10 is operative to divide the virtual tributary (VT) sizes of the input side transmission line signals into whole integers by predetermined common size units and perform the cross connection using the resultant divided VT signals as cross connection units.

In this case, the numbers of bytes of the common size are selected to be the numbers equal to one of the common divisors obtained when dividing the number of bytes of the above VT sizes by whole integers without reminders.

More particularly, the greatest common divisor among the common divisors is preferably set as the number of bytes of the common size.

This will be explained in more detail using specific examples.

Figure 2:
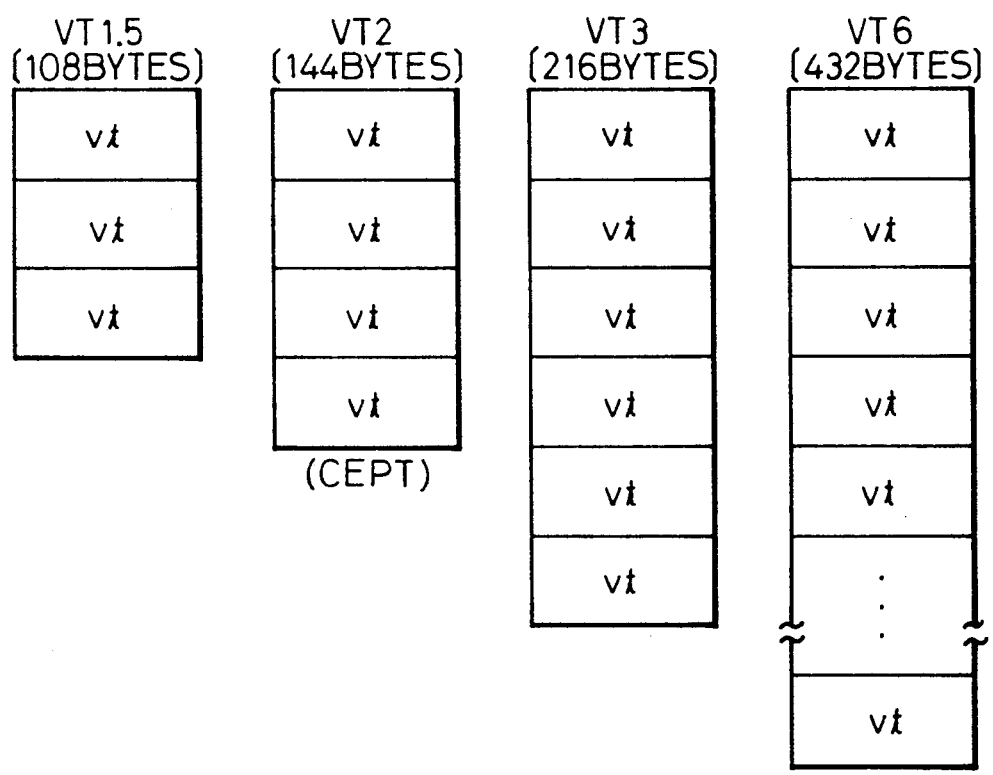
FIG. 2 is a view illustrating the point of the present invention.

FIG. 2 is a view illustrating the point of the present invention. In the figure, VT1.5, VT3, and VT6 are three types of VT signals based on SONET specifications, which are mainly of the North American specifications. VT2 is a VT signal based on the SONET specification, which is mainly of the CEPT specifications. The VT sizes, in terms of the number of bytes, are, as illustrated, 108, 144, 216, and 432 bytes. In the present invention, these VT sizes are divided into whole integers by predetermined common size units and perform the cross connection in the switch unit 10 using the thus obtained divided VT signals vt as cross connection units.

Figure 3:
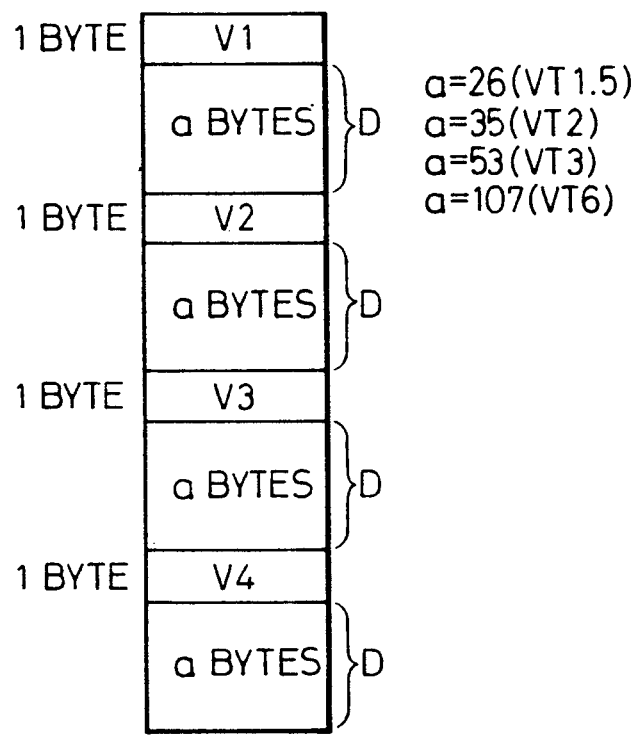
FIG. 3 is a view showing the format of a VT frame used in the SONET specification.

FIG. 3 is a view showing the format of a VT frame used in the SONET specification. As shown in the figure, the VT frame used in the SONET specification has the format of four VT payload pointer parts V1, V2, V3, and V4 and four data parts D of a bytes each. Here, the VT payload pointer parts V1, V2, V3, and V4 are each composed of one byte. Further the number of bytes a of the data parts D is 26 in the case of the VT1.5 size, 35 in the case of the V2 size, 53 in the case of the V3 size, and 107 in the case of the VT6 size. Therefore, the total number of bytes is 108 (26 ×4+4) in the case of the VT1.5 size, 144 (35×4+4) in the case of the VT2 size, 216 (53×4+4) in the case of the VT3 size, and 432 (107×4+4) in the case of the VT6 size.

Here, taking note of the VT1.5 size and the VT2 size, these sizes are not whole multiples of each other, so if one of the sizes (VT1.5 or VT2) is used as the cross connection unit as it is, it becomes impossible to perform the cross connection commonly for all these sizes in a common switch unit 10.

According to the present invention, as mentioned earlier, the most preferable mode is one in which the greatest common divisor is made the number of bytes of the common size. In other words, a VT2 size frame is made up of 4/3 times the number of bytes as a VT1.5 size frame, so the VT2 size is divided by the integer 4 and the VT1.5 size is divided by the integer 3 and 36 bytes is used as the unit of cross connection. In this way, in the digital cross connection apparatus, common use may be made of the switch unit 10 to cross connect the VT1.5 size and the VT2 size.

Looking at the VT3 size and the VT6 size as well, these are whole multiples of size of the above cross connection unit (216=36×6, 432=36×12), so it is similarly possible to perform cross connection commonly in the switch unit 10 using common hardware.

Figure 4:
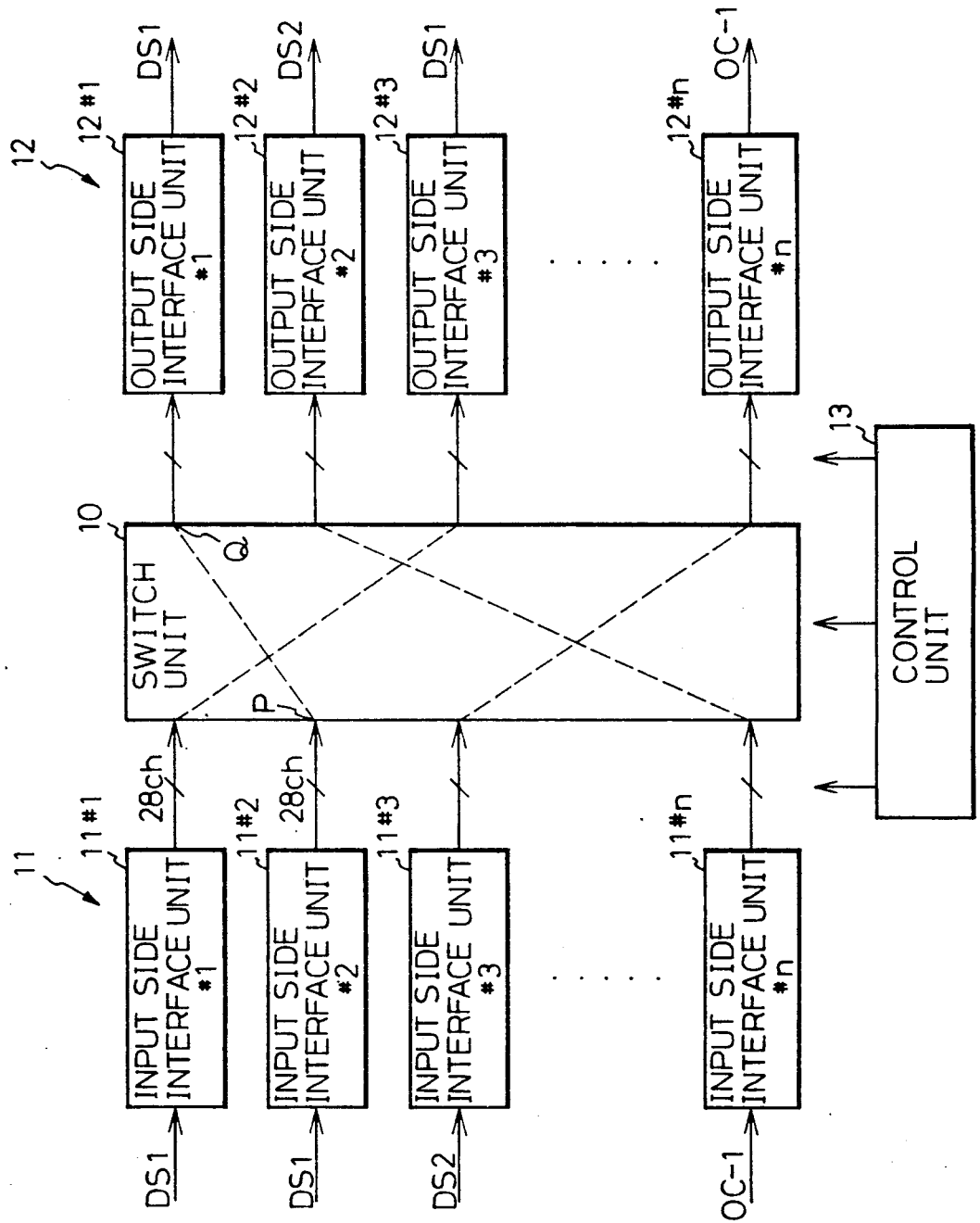
FIG. 4 is a view showing in further detail the constitution of FIG. 1.

FIG. 4 is a view showing in further detail the constitution of FIG. 1. In the figure, 11#1 to 11#n are input side interface units, 10 is the above-mentioned switch unit, and 12#1 to 12#n are output side interface units.

The input side interface units 11#1 to 11#n receive the various types of input side transmission line signals such as DS1, DS2, DS3, OC-1, and OC-3, convert these into VT signals for handling in the cross connection apparatus, divide these into predetermined cross connection units as mentioned earlier, use the results as divided VT signals vt, and transmit them to the switch unit 10. Note that DS1 is a first order group signal, DS2 is a second order group signal, and OC-1 is an optical carrier (level 1).

Here, the switch unit 10 is a circuit designed so as to cross connect signals from the input side interface unit (11) using predetermined cross connection units. Further, the output side interface units 12#1 to 12#n function to combine the divided VT signals which have been cross connected, reconstruct them, convert them to the original transmission line signals, and send them to the transmission line as output side transmission line signals.

Below, the operation of the apparatus of this embodiment will be explained.

The input side interface units 11#1 to 11#n convert the input transmission line signals to VT signals of the predetermined VT format and further divide the VT signals into whole integers by predetermined common size. The common size is selected so that the VT sizes handled at the input side interface units 11#1 to 11#n become whole multiples of each other.

Figure 5:
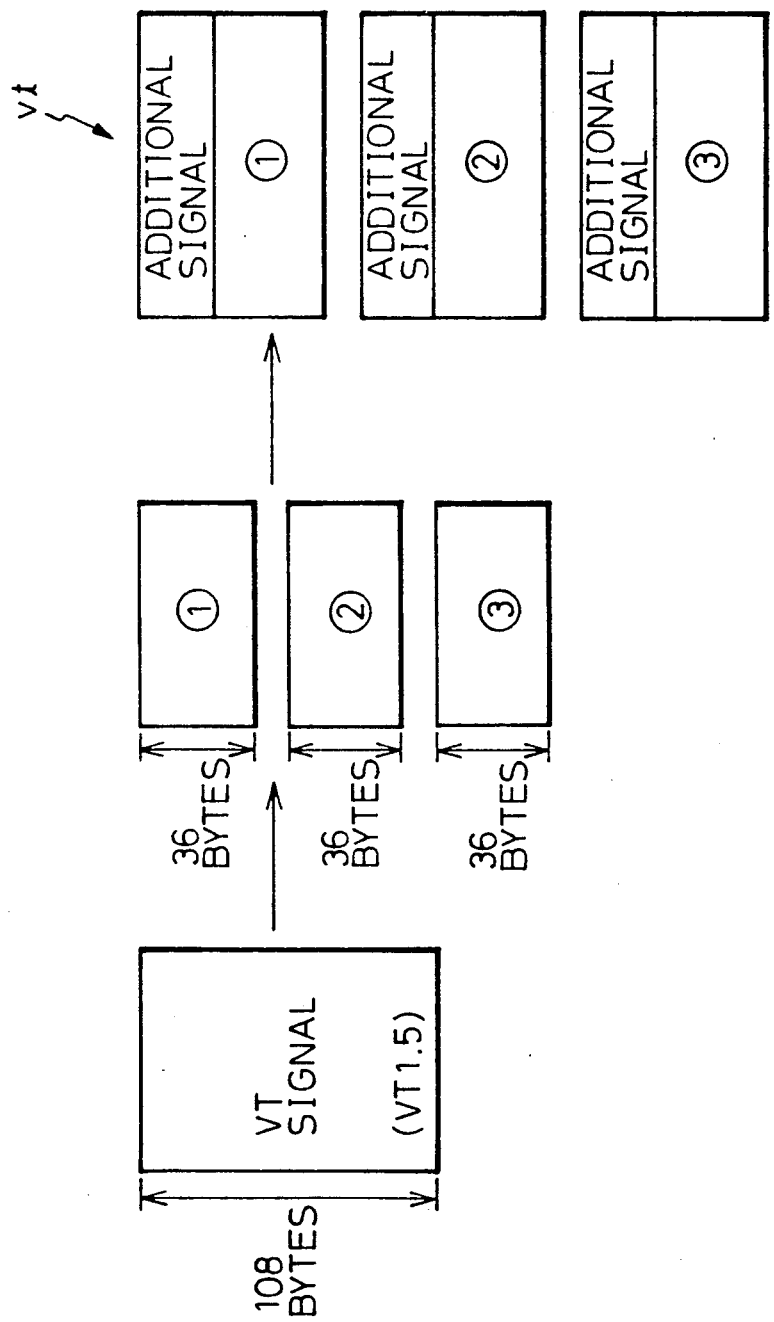
FIG. 5 is a view showing an example of division of VT signals of VT1.5 size based on the present invention to obtain divided VT signals.

FIG. 5 is a view showing an example of division of VT signals of VT1.5 size based on the present invention to obtain divided VT signals. In the case of VT signals of a VT1.5 size, as shown in the figure, VT1.5 frames of 108 bytes are divided into three to five blocks of 36 bytes each. Additional signals are attached to each of these (additional bytes) and the result used as the cross connection unit. This is the divided VT signal vt. The same type of division is performed for the case of VT2 size, VT3 size, and VT6 size VT signals.

Figure 6:
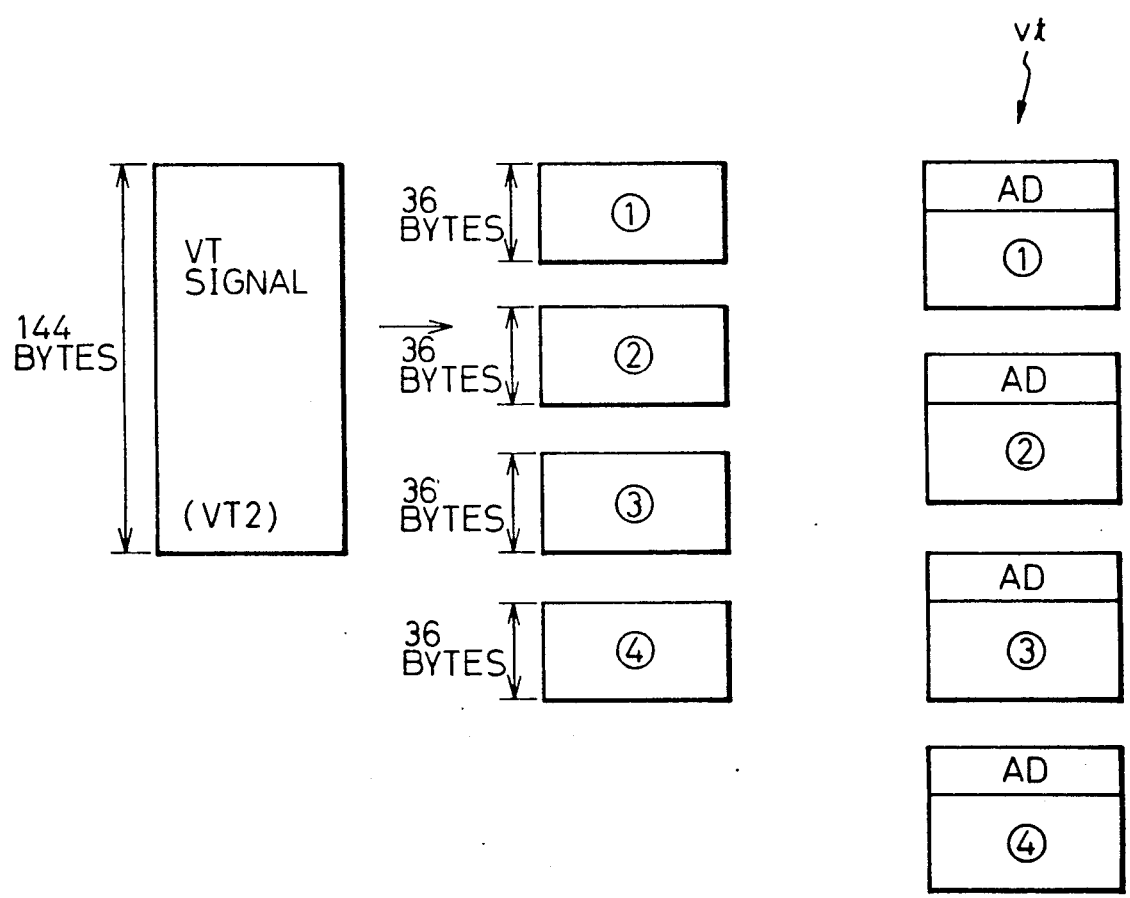
FIG. 6 is a view showing an example of division of VT signals of VT2 size based on the present invention to obtain divided VT signals.
Figure 7:
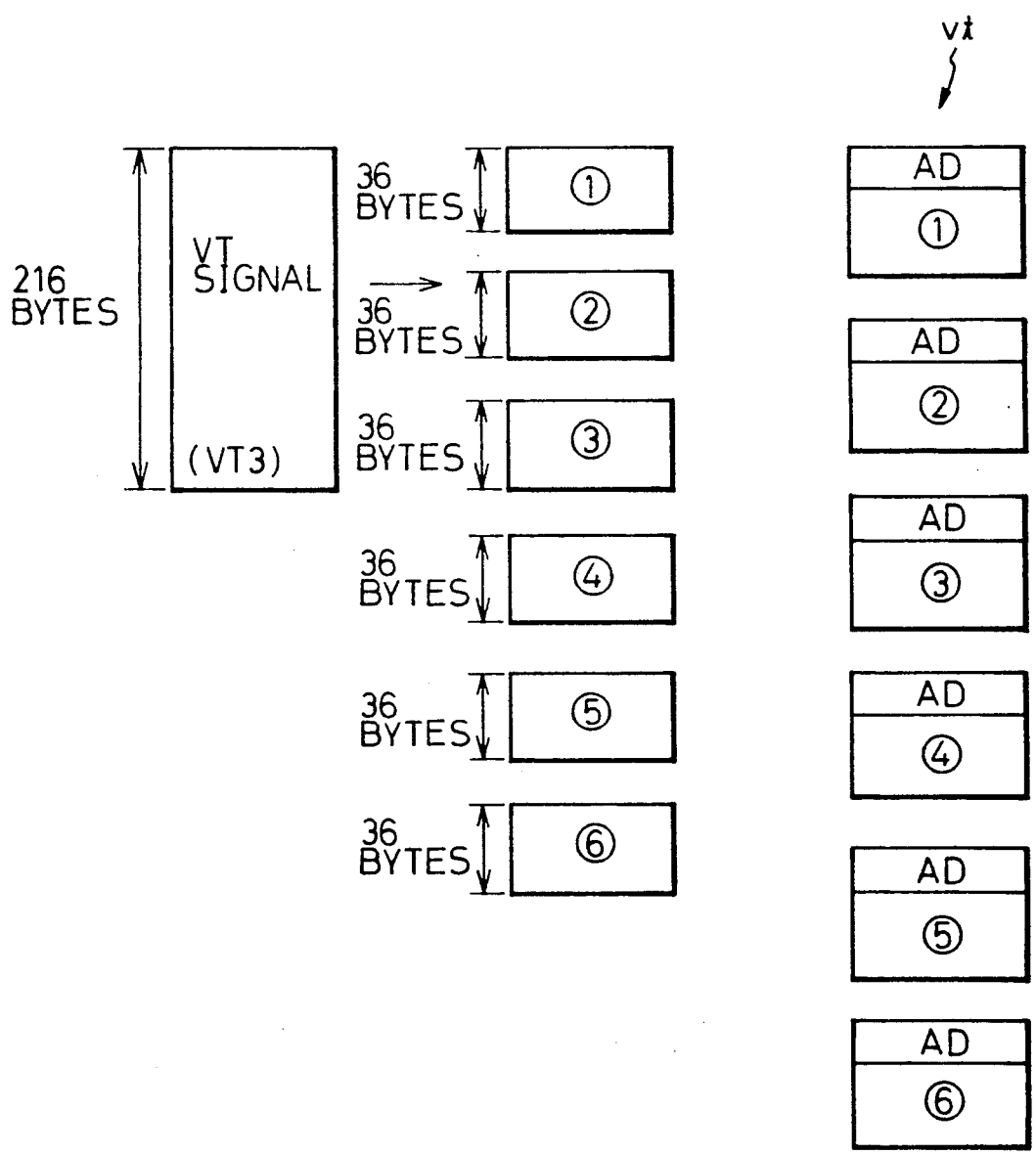
FIG. 7 is a view showing an example of division of VT signals of VT3 size based on the present invention to obtain divided VT signals.
Figure 8:
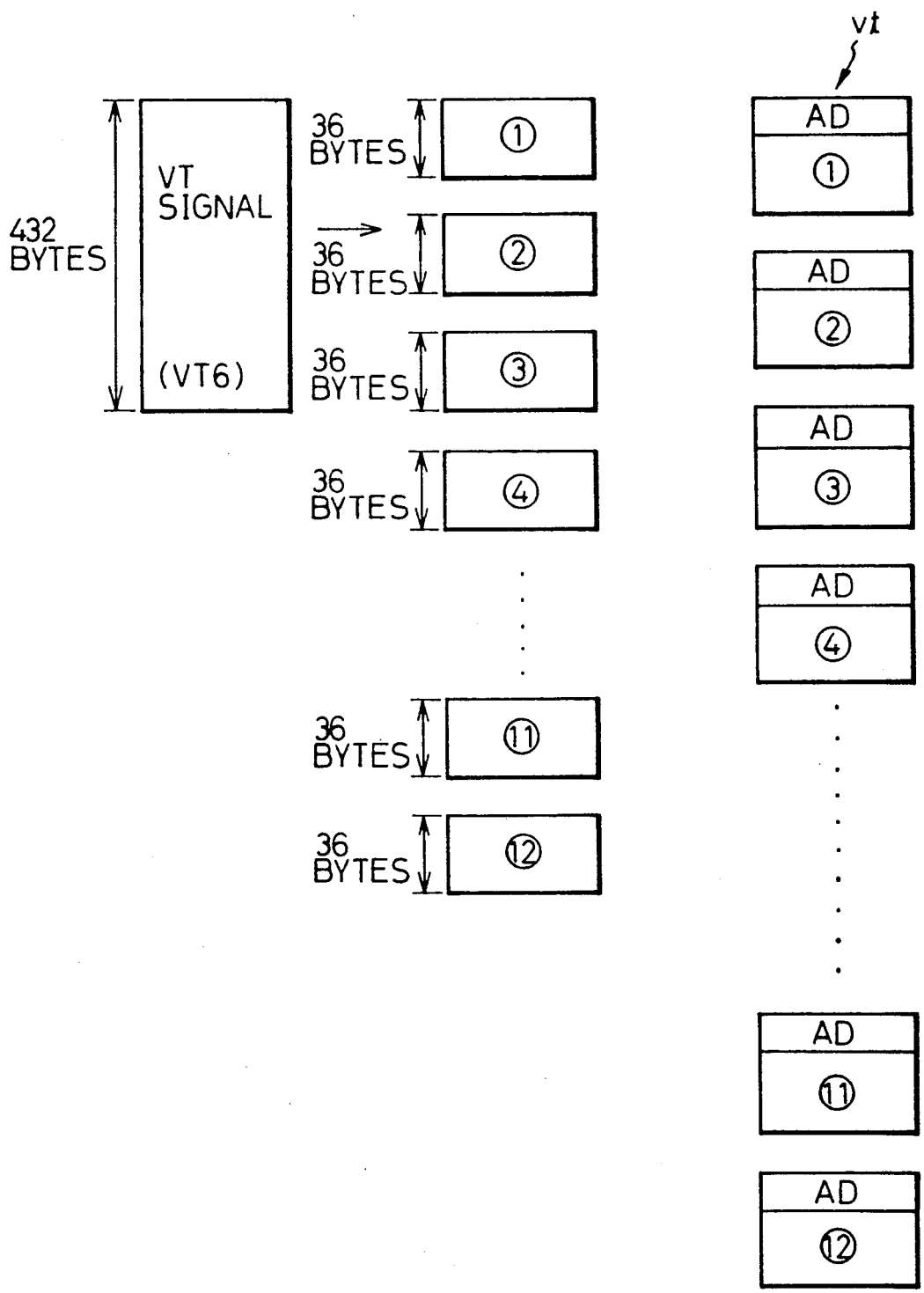
FIG. 8 is a view showing an example of division of VT signals of VT6 size based on the present invention to obtain divided VT signals.

FIG. 6 is a view showing an example of division of VT signals of VT2 size based on the present invention to obtain divided VT signals. FIG. 7 is a view showing an example of division of VT signals of VT3 size based on the present invention to obtain divided VT signals. FIG. 8 is a view showing an example of division of VT signals of VT6 size based on the present invention to obtain divided VT signals. Note that in FIG. 6, FIG. 7, and FIG. 8, AD is the abbreviation for the additional signal of FIG. 5.

As seen in FIG. 6, a VT2 frame made up of 144 bytes is divided into four and additional bytes are attached to each block. Similar division is possible for the VT3 and VT6 sizes using units of 36 bytes as shown in FIG. 7 and FIG. 8.

Further, since the STS-1 signal, a SONET signal of 50M, is also composed of VT-1.5×30 bytes=4 frames, similar division is possible. STS-1 is, as is well known, a synchronous transport signal-1.

Next, an explanation will be made of the above-mentioned additional signal.

Figure 9:
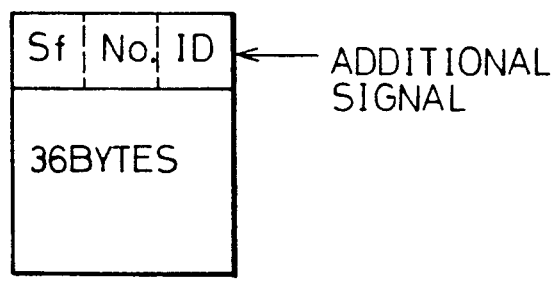
FIG. 9 is a view showing the schematic construction of a divided VT signal serving as a cross connection unit.

FIG. 9 is a view showing the schematic construction of a divided VT signal serving as a unit of cross connection. The additional signal is composed of k (k=1, 2, 3. . . ) bytes as additional bytes and consists of the frame synchronization information $S_f$ and division number information No. showing the order of the division in the cross connection apparatus. More preferably, it includes path identification information ID showing which one of the plurality of cross connection paths (see the dotted lines in switch unit 10 in FIG. 4) formed in the switch unit 10 the divided VT signal vt must pass through. That is, the frame synchronization information is for frame synchronization after the cross connection, the division number information is for showing the order of the divided VT signals, and the path ID information is for showing the path route in the switch unit 10.

The common size blocks with these additional bytes attached are sent from the input side interface unit 11#1 to 11#n to the switch unit 10. These are cross connected at the switch unit 10 and sent to the output side interface units 12#1 to 12#n. The output side interface units 12#1 to 12#n perform synchronizations with respect to the input common size blocks (vt) referring to their additional bytes and reconstruct them to the original VT signals in accordance with the division numbers No's. They further convert them into transmission line signals and output the result.

Figure 10:
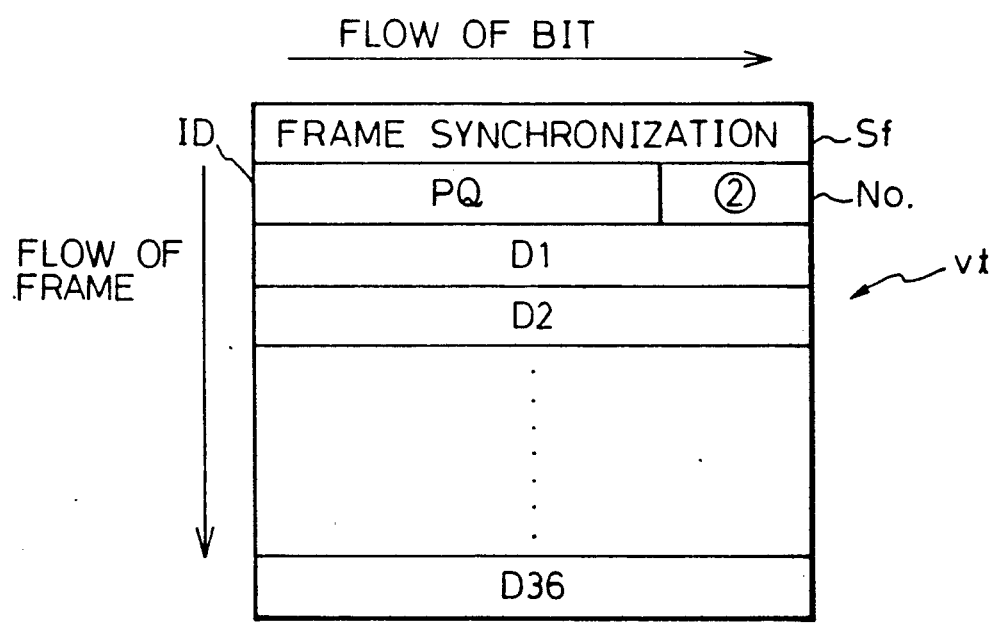
FIG. 10 is a view showing the detailed construction of a divided VT signal serving as a cross connection unit.

FIG. 10 is a view showing the detailed construction of a divided VT signal serving as a cross connection unit. In the example shown in the figure, the additional signals are composed of 2 bytes, of which one byte shows the frame synchronization information $S_f$ and the other byte shows both the path ID information and division number information. When the path ID information becomes "PQ", it shows that the divided VT signal is cross connected passing through the path between P and Q in the switch unit 10 in FIG. 4. Note that the designation of the path between P and Q is usually performed by the cross connection control unit 13. Further, for example, ② is written as the division number information, showing that the divided VT signal is the second divided signal.

The portion of the divided VT signal vt remaining after removal of the additional signal is composed of the data signals D1, D2 ... D36, composed of 36 bytes.

Figure 11:
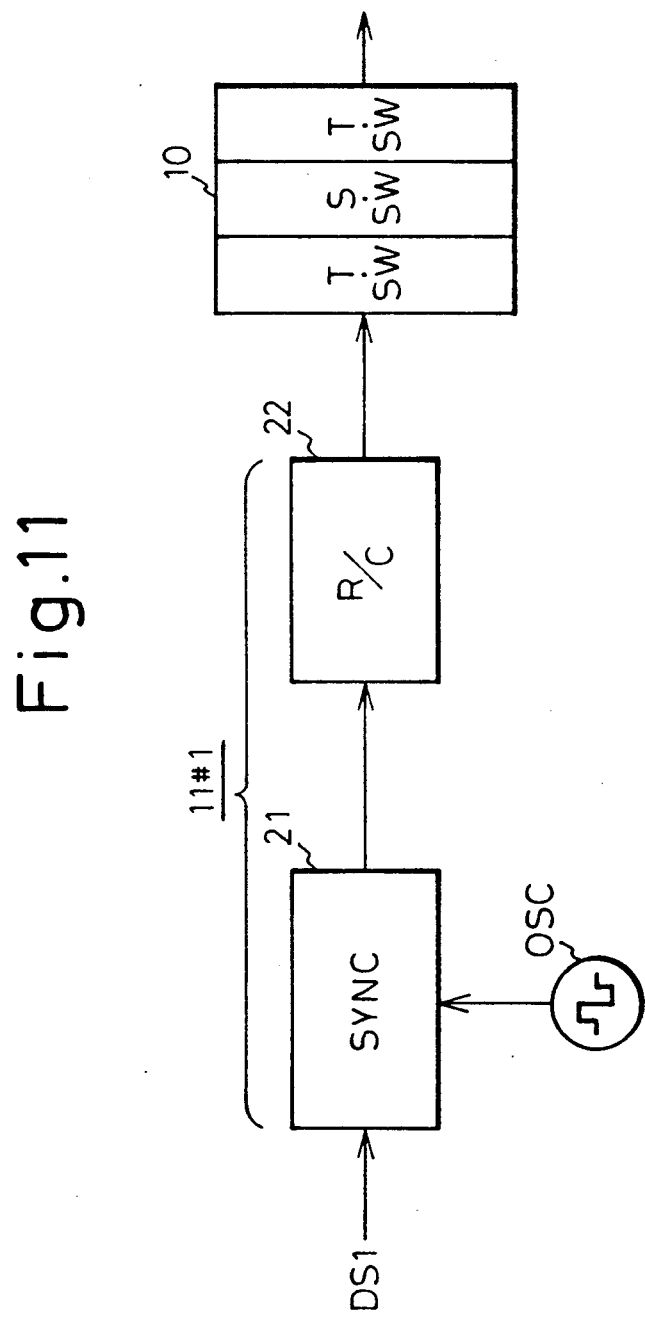
FIG. 11 is a block diagram showing an example of a known base construction of an input side interface unit.

FIG. 11 is a block diagram showing an example of a known base construction of an input size interface unit. For example, this is the construction of the unit 11#1 in FIG. 4. The units 11#2 to 11#n have exactly the same basic construction. Note that the block of FIG. 11 does not include the structural portion of the present invention. Further, the output o side interface units 12#1 to 12#n have the opposite construction as in FIG. 11 and basically are the same as the input side interface in basic construction.

In FIG. 11, the input side transmission line signal DS1 is first applied to the synchronizing means (SYNC) 21, where it is synchronized in subordination to the master clock (oscillator OSC) in the digital cross connection apparatus. After this, it is applied to the row/column conversion means (R/C) 22, where the signal format of the VT signal is converted so as to facilitate the cross connection in the switch unit 10 mounted at the next stage thereto. Note that the switch unit 10 usually is of a T-S-T switch construction, where T means a time switch (T·SW) and S means a space switch (S·SW).

Figure 12:
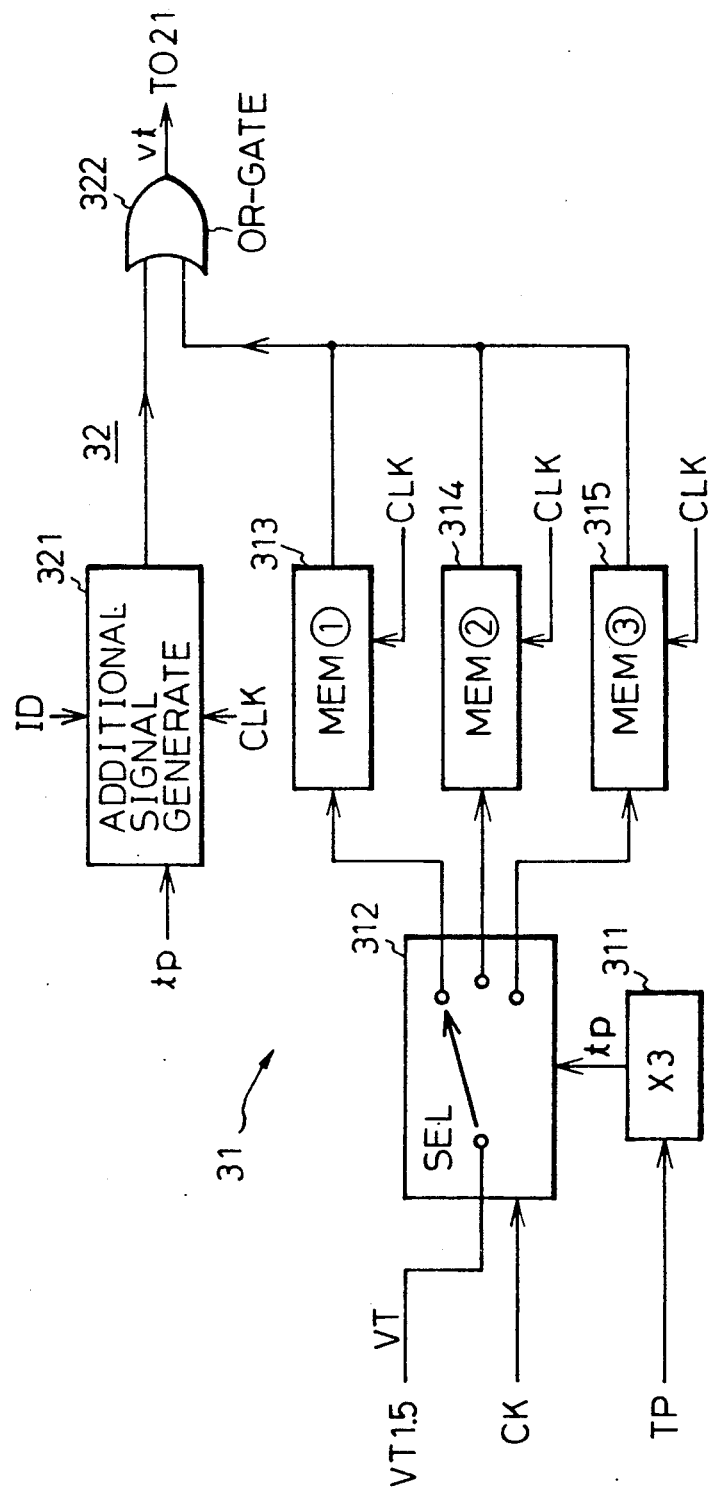
FIG. 12 is a view showing a processing means according to the present invention which is provided in an input side interface unit.

FIG. 12 is a view showing a processing means according to the present invention which is provided in an input side interface unit. FIG. 13 is a view showing a processing means according to the present invention which is provided in an output side interface unit. However, this shows an example of a circuit handling a V1.5 transmission line signal. By simply changing the division number No., it is possible to similarly realize a circuit handling VT2, VT3, and VT6 transmission line signals.

The processing means of the input side interface unit, shown in FIG. 12 has a division means 31 for dividing the input side transmission line signal (DS1) by an amount corresponding to the number of the above integers.

The output side interface unit (12) in FIG. 13 has a combining means 41 for combining the plurality of divided VT signals vt from the switch unit 10 to reconstruct the VT signal.

In FIG. 12, the division means 31 cooperates with an additional signal generating means 32 for generating the additional signals.

In FIG. 13, the combining means 41 cooperates with a combining controlling means 42 for a combining control in accordance with the above additional signal.

In FIG. 13, the combining controlling means 42 further cooperates with a separating means 43 for separating the additional signals from the corresponding divided VT signals and inputting the separated divided VT signals vt' to the combining means 41.

In FIG. 12, the division means 31 can be realized by the structural elements 311 to 315 shown in the figure. Reference numeral 311 is a triple-multiplying circuit which receives timing pulses TP (occurring at each top of the VT signals in FIG. 5) showing the headers of the frames of the VT signals and multiplies the frequencies of the same by three. The timing pulses tp of the triple frequency correspond to the tops of the blocks (①, ②, and ③) in FIG. 5. At the timing pulse tp, the switch in the selector (SEL) 12 is successively cyclically switched. This being so, the data corresponding to the blocks ①, ②, and ③ in FIG. 5 is successively cyclically stored in the memories 313, 314, and 315.

At the headers of the data successively cyclically read out from the memories 313 to 315 are given with additional signals. This is done by the additional signal generating means 32. Specifically, this means is comprised of an additional signal generator 321 and OR gate 322. The generator 321 generates at least the frame synchronization information $S_f$ (FIG. 10) and the division number information No. (FIG. 10).

The frame synchronization information $S_f$ is obtained from a pattern generator which produces a predetermined fixed pulse pattern, e.g., "10101010". The division number information No. is obtained as the output of a counter receiving as input the timing pulse tp, which counter is mounted in the generator 321.

The path identification information (ID) (for example, PQ in FIG. 10) is information which naturally is known by the cross connection control unit 13. This is used as input for the generator 321.

The above information $S_f$, No., and ID are attached to the divided blocks (data parts) at the OR gate 322 to form the divided VT signals vt.

In FIG. 13, the combining means 41 includes a memory (MEM) 411, a switch 412, and a multiplexer (MUX) 413. On the other hand, the combining control means 42 includes the structural elements 421 and 422 shown in the figure. Reference numeral 421 represents a frame synchronization circuit (SYNC) which monitors the additional signals in the received divided VT signals and detects the frame synchronization signals $S_f$ in the same. By detecting the synchronization signals $S_f$, the headers of the frames of the divided VT signals are recognized.

Using the synchronization signals $S_f$, the division number information detection circuit (No.) 422 extracts the bit portion shown by the No. of FIG. 10 and detects the division number (①, ②, or ③), or The division number is input to the switch 412, one port corresponding to the division number of the received vt (one of the three ports) is selected, and the signal from the memory 411 is input through the selected port to the multiplexer 413. A similar operation is performed for the other division number signals and the VT signal is reconstructed.

The frame synchronization signal from the frame synchronization circuit 421 is supplied to the separation means 43 as well, where the byte portion corresponding to the additional signal is removed from the divided VT signals vt and only the data part in the vt is obtained as vt'. vt' is stored once in the memory 411.

The separation means 43 is comprised mainly of the gate circuit and passes the signal vt to the memory 411 side only at every timing where no additional signal exists, based on the frame synchronization signal $S_f$. At other timings, the signal vt is input to a path identification matching circuit 44. The circuit 44 monitors the ID portion of FIG. 10, monitoring if the path PQ matches the PQ known from the cross connection control unit 13, and when not matching, issues the alarm signal ALM.

As explained above, it is possible to cope with any SONET signal by just replacing the portions for processing the cross connection units and it is possible to make common use of both the switch unit 10 and other hardware.

Therefore, according to the present invention, it is possible to cross connect the North American, CEPT, and other specification SONET signals by the same hardware.

What is claimed is:

1. A digital connection apparatus comprising:
   a switch unit which performs a cross connection;
   an input side interface unit which is provided at an input side of the switch unit and receives a plurality of input side transmission line signals composed of two or more types of virtual tributary (VT) signals; and
   an output side interface unit which is provided at an output side of the switch unit and transmits signals which have been cross connected by the switch unit as a plurality of output side transmission line signals, wherein
   the switch unit is operative to divide the virtual tributary (VT) sizes of the input side transmission line signals into whole integers by predetermined common size unit and perform the cross connection using the resultant divided VT signals as a cross connection unit.

2. An apparatus as set forth in claim 1, wherein the numbers of bytes of the common size are determined to be the numbers equal to one of the common divisors obtained when dividing the number of bytes of the VT sizes by whole integers without reminders.

3. An apparatus as set forth in claim 1, wherein the greatest common divisor among said common divisors is set as the number of bytes of the common size.

4. An apparatus as set forth in claim 2, wherein in said input side interface unit, unique additional signals are attached to each of the divided VT signals and the results are input to the switch unit and
   in said output side interface unit, the VT signals are reconstructed in accordance with the content of the additional signals and then the resultant output side transmission line signal is output.

5. An apparatus as set forth in claim 4, wherein the content of said additional signals is at least a frame synchronization information used when reconstructing the output VT signal and a division number information showing the order of division.

6. An apparatus as set forth in claim 5, wherein the content of said additional signals includes path identification information showing which one of the plurality of cross connection paths formed in said switch unit said divided VT signals must pass through.

7. An apparatus as set forth in claim 3, wherein said VT signal is a signal based on the SONET specifications and the value of the integer is "36" when at least two types of the North American specification signals (VT1.5, VT3, or VT6) and CEPT specification signals (VT2) are mixed as said VT signals.

8. An apparatus as set forth in claim 4, wherein said input side interface unit has a division means for dividing the input side transmission line signal by an amount corresponding to the number of the above integers and
   said output side interface unit has a combining means for combining the plurality of divided VT signals from the switch unit to reconstruct the output VT signal.

9. An apparatus as set forth in claim 8, wherein said division means cooperates with an additional signal generating means for generating the additional signals.

10. An apparatus as set forth in claim 8, wherein said combining means cooperates with a combining controlling means for a combining control in accordance with the above additional signal.

11. An apparatus as set forth in claim 10, wherein said combining controlling means further cooperates with a separating means for separating the additional signals from the corresponding divided VT signals and inputting the separated divided VT signals to the combining means.

* * * * *